(12) United States Patent
Farchi et al.

(10) Patent No.: US 8,423,960 B2
(45) Date of Patent: Apr. 16, 2013

(54) EVALUATION OF SOFTWARE BASED ON REVIEW HISTORY

(75) Inventors: Eitan Daniel Farchi, Pardes Hana (IL); Sergey Novikov, Tel-Aviv (IL); Orna Raz-Pelleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 12/058,779

(22) Filed: Mar. 31, 2008

(65) Prior Publication Data

US 2009/0249299 A1 Oct. 1, 2009

(51) Int. Cl.
*G06F 9/44* (2006.01)
*G06F 9/45* (2006.01)

(52) U.S. Cl.
USPC ........... 717/124; 717/101; 717/102; 717/120; 717/128; 717/131; 717/159

(58) Field of Classification Search ................ None
See application file for complete search history.

(56) References Cited

U.S. PATENT DOCUMENTS

| | | | |
|---|---|---|---|
| 6,718,535 B1* | 4/2004 | Underwood | 717/101 |
| 7,028,290 B2* | 4/2006 | Srivastava et al. | 717/124 |
| 7,653,899 B1* | 1/2010 | Lindahl et al. | 717/128 |
| 2003/0188291 A1* | 10/2003 | Fisher | 717/102 |
| 2003/0204836 A1* | 10/2003 | Srivastava et al. | 717/124 |
| 2005/0120274 A1* | 6/2005 | Haghighat et al. | 714/38 |
| 2006/0070048 A1* | 3/2006 | Li et al. | 717/144 |
| 2007/0022407 A1* | 1/2007 | Givoni et al. | 717/124 |
| 2007/0168959 A1* | 7/2007 | Bayari et al. | 717/120 |
| 2007/0180430 A1* | 8/2007 | Farchi et al. | 717/126 |
| 2007/0226691 A1* | 9/2007 | Happell et al. | 717/124 |
| 2008/0148247 A1* | 6/2008 | Galler et al. | 717/154 |
| 2008/0295085 A1* | 11/2008 | Rachamadugu et al. | 717/159 |
| 2009/0044177 A1* | 2/2009 | Bates et al. | 717/131 |
| 2009/0144698 A1* | 6/2009 | Fanning et al. | 717/120 |
| 2009/0271760 A1* | 10/2009 | Ellinger | 717/101 |

OTHER PUBLICATIONS

Thomas Drake, Testing Software Based Systems: The Final Frontier, 1999, [Retrieved on Nov. 27, 2012]. Retrieved from the internet: <URL: http://www.dtic.mil/cgi-bin/GetTRDoc?Location=U2&doc=GetTRDoc.pdf&AD=ADA371840> 24 Pages (1-24).*

Darius Sidlauskas et al., Information Visualization and Machine Learning Applied on Static Code Analysis, 2008, [Retrieved on Nov. 27, 2012]. Retrieved from the internet: <URL: http://netlearning2002.org/fou/cuppsats.nsf/all/a45ead63a287ce18c1257476002d87fc/$file/thesis_mse_2008_09.pdf> 43 Pages (1-38).*

* cited by examiner

*Primary Examiner* — Don Wong
*Assistant Examiner* — Anibal Rivera
(74) *Attorney, Agent, or Firm* — Daniel Kligler

(57) ABSTRACT

A method for software processing in which software locations are assigned priorities indicative of respective likelihoods that the locations contain program faults, based on review information pertaining to reviews that have been conducted on respective locations in software code. In some methods, a software location is detected to be critical based on the priorities.

20 Claims, 2 Drawing Sheets

EVALUATION OF SOFTWARE BASED ON REVIEW HISTORY

BACKGROUND

The present invention relates generally to computer software, and particularly to methods and systems for developing and verifying software code.

Software code is typically reviewed and tested for faults ("bugs") during its development cycle. Software review typically comprises a systematic process, in which one or more reviewers examine some or all of the code and attempt to identify bugs. Software testing commonly involves subjecting the code to a set of test cases, referred to as a test suite. It is often of interest to assess the coverage of the test suite, i.e., the amount of code that is actually executed by the test cases. Various methods for assessing test coverage are known in the art. Test coverage assessment is sometimes used for improving the test suite.

BRIEF SUMMARY

Embodiments of the present invention provide a computer-implemented method for software processing. The method includes obtaining review information pertaining to reviews that have been conducted on respective locations in software code. The review information is processed so as to assign to at least some of the locations respective priorities, which are indicative of respective likelihoods that the locations contain program faults. The at least some of the locations are presented to a user via an output device in accordance with the assigned priorities.

There is additionally provided, in accordance with another embodiment of the present invention, a computer-implemented method for software processing in which a given location in the software code is detected as critical based on the review information. The detected critical location is indicated to the user. Other disclosed embodiments provide apparatus for software processing.

The present invention will be more fully understood from the following detailed description of the embodiments thereof, taken together with the drawings in which:

DETAILED DESCRIPTION

Overview

Figure 1:
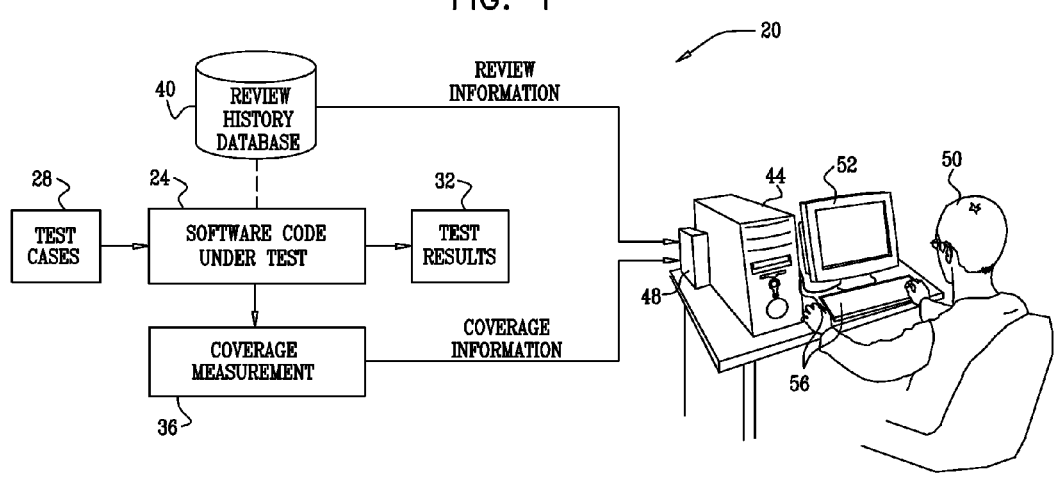
FIG. 1 is a block diagram that schematically illustrates a system for software testing, in accordance with an embodiment of the present invention.

In most software development processes, the developed code is reviewed in order to identify potential faults ("bugs"). The term "review" is used herein to describe a process, in which one or more human reviewers (typically programmers) examine the software code or parts thereof in order to detect program faults. Reviews are often conducted in sessions, in which the reviewed code is presented and discussed. Typically, certain information related to the review sessions is recorded for later use. This information (which is referred to herein as "review information") may comprise, for example, the time in which a given session occurred, identification of reviewed code locations, faults located during the session and/or code changes triggered by the session. Some review processes are assisted by automated review tools, which present the code in question, track the session progress and record at least some of the review information.

Code review is often applied to only selected locations in the code because of cost and time constraints. Nevertheless, some code locations may be reviewed more than once. In some cases, code review leads to the identification of faults and to subsequent changes in the code. In many development processes, code review processes are tracked and stored for future use.

The stored records of past code reviews may sometimes contain information that is valuable for locating faults in the code. In many cases, the review history of a particular code location is indicative of the likelihood of fault occurrence in this location. For example, a code location that was reviewed and not changed since the review can be regarded as less likely to contain faults, in comparison with locations that were never reviewed. In other cases, review history may be indicative of the criticality of a given code location. For example, multiple reviews of the same code location may indicate a critical or suspect location that deserves further attention.

Embodiments of the present invention provide improved methods and systems for testing, reviewing, modeling and generally operating on software code. The methods and systems described herein determine the attention levels that should be given to different locations in the code, e.g., in testing or reviewing the code, based on the review history of these locations.

In some embodiments that are described hereinbelow, a review history database stores information pertaining to past reviews that were applied to the code in question. This information is referred to herein as review information. A prioritization processor obtains the review information from the database, and assigns priorities to respective locations of the code (e.g., to files, lines or functions) based on the review information. The processor outputs a prioritized list of code locations to a user. The user performs an operation with respect to the software code, e.g., tests or re-reviews the code, based on the prioritized list of locations.

The prioritized list focuses the user's attention on code locations that deserve special attention (e.g., fault-prone code locations or critical sections), and enables the user to disregard code locations of lower significance. In other words, the priorities are indicative of additional resources that should be allocated to the respective code locations.

The process of testing, reviewing or otherwise operating on the software code can be modified based on the prioritized list, so as to concentrate on high-priority locations first. Thus, limited resources can be allocated effectively and not wasted on code locations that were already reviewed and found satisfactory. As a result, the prioritization methods described herein may considerably improve the quality of software testing, review or verification.

In some embodiments related to testing, the prioritization processor combines the review history information with coverage information, which assesses the level of coverage of different code locations by a given set of test cases. In these embodiments, the prioritization processor assigns the priorities based on both the review information and the coverage information. In other words, the processor assigns high priorities to code locations that are worthy of special attention but currently lack coverage. Modifying the test procedure based on the prioritized list may significantly improve testing quality and efficiency.

Various criteria and heuristics can be used for assigning priorities to code locations based on review history. Several exemplary criteria are described herein.

System Description

FIG. 1 is a block diagram that schematically illustrates a system 20 for software testing, in accordance with an embodiment of the present invention. System 20 tests software code 24 by subjecting the code to test cases 28. The test procedure produces test results 32, which typically indicate identified faults and additional information for debugging purposes.

System 20 comprises a coverage measurement unit 36, which assesses the coverage achieved by test cases 28 and produces coverage information. The coverage information may indicate, for example, locations in the code that were covered by the test cases, locations that were not covered by the test cases, quantitative measures of coverage or lack of coverage, and/or any other information that is indicative of coverage of code 24 by test cases 28.

System 20 further comprises a review history database 40, which stores information pertaining to past reviews that have been conducted on software code 24. Review history information can be generated and stored in various ways. For example, software is sometimes reviewed with the assistance of an automated review tool. In some cases, the review tool stores information as to the reviewed code locations, comments made by the reviewers with respect to certain code locations, faults that were identified at certain code locations during the review, changes performed at certain code locations as a result of the review, and/or any other relevant information related to the review.

As another example, the review tool may attach markers (e.g., comments) to reviewed code locations during a review session. Alternatively, reviewed code locations may be marked or commented manually by the reviewers. As yet another example, the code location that is currently examined by the reviewers can be determined automatically, such as by tracking the screen location of a pointer (e.g., mouse arrow) displayed by the review tool. In some embodiments, any code location that is pointed to during a review session can be regarded and marked as reviewed.

In some embodiments, the review information is stored along with the reviewed source code, or even embedded in the source code. In other embodiments, the review information can be stored separately, such as in a dedicated database or other data structure. Such a data structure may store review information produced during a single review session or in multiple sessions. In some embodiments, at least some of the review information is stored in a Version Control System (VCS) that tracks the different versions of the code.

The methods and systems described herein can be used with any suitable technique for obtaining review information, such as the exemplary techniques described above. The term "review history database" is used herein in a broad sense and is meant to cover any suitable means for storing the review information, either together with or separately from the code in question.

The review information is typically related to a particular location, or set of locations, of the code. In the context of the present patent application and in the claims, the terms "location" and "code location" refer to any desired partition of the software code at any suitable granularity, such as, for example, files, program lines, program addresses, functions, basic blocks, objects (e.g., classes in an object-oriented code) and/or variables.

The coverage information produced by unit 36 and the review information stored in database 40 are both provided to a prioritization processor 44. Processor 44 processes the coverage information and the review information jointly, using methods and heuristics that are described below, and produces a prioritized list of code locations.

The coverage information and review information are provided to processor 44 via an interface 48. The functionality of the interface may vary depending on the specific coverage measurement unit and review history database that are used. The interface may proactively request information from unit 36 or database 40, and/or passively accept information sent to it as it becomes available. Processor 44 typically presents the prioritized list of code locations to a user 50 using a suitable output device, such as a display 52. The user interacts with processor 44 using a suitable input device 56, such as a mouse or keyboard.

Typically, processor 44 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, the functions of two or more components of system 20 may be carried out by a single processor. For example, the functions of processor 44 and unit 36 may be carried out by a single workstation, possibly together with a test generation unit that produces test cases 28.

Prioritization of Code Locations Based on Review History

Prioritization processor 44 may apply various criteria, rules or heuristics for assigning priorities, or weights, to code locations based on review history information. For example, the priority of a given code location may reflect the fact that the location was or was not reviewed, the number of review sessions conducted on the location, changes that were performed on the code in the given location, and/or the times in which such reviews and changes occurred.

In some embodiments, processor 44 classifies the code locations into several classes, based on the review information. Each code location is prioritized in accordance with the class with which it is associated. For example, code locations can be classified into four classes:

| Class | Description |
| --- | --- |
| A | Code locations that were never reviewed. |
| B | Code locations that were reviewed once and have not changed since the review. |
| C | Code locations that were reviewed multiple times and have not changed since the last review. |
| D | Code locations that were reviewed at least once and have changed since the last review. |

In some embodiments, processor 44 assigns locations in class B lower priorities with respect to the other classes, since code locations that were reviewed but did not change can be assumed to contain fewer bugs. Typically, processor 44 assigns the locations in classes C and D priorities that are at least as high as the priorities assigned to the locations in class A, since locations that were reviewed multiple times are typically either highly critical or raise special concerns, and locations that changed are typically more likely to contain bugs. In some embodiments, processor 44 assigns the locations in class C relatively high priorities, since the fact that these locations were reviewed multiple times may indicate that the reviewers suspected them, or regarded them as critical or important.

In some embodiments, the different code locations within each class are assigned the same priority. For example, locations associated with classes A, B, C, and D may be assigned priorities 1, 0, 3 and 4, respectively. Alternatively, classes C and D may be assigned the same priority.

In alternative embodiments, however, processor 44 may also prioritize the locations within a given class, while preserving the priority relationships between different classes. For example, the locations in class C may be prioritized in accordance with the number of times the locations have been reviewed. As another example, the locations in class D may be prioritized in accordance with number of changes and/or the number of reviews applied to each location. Information regarding the presence or absence of changes and/or regarding the number of changes can be obtained by querying a VCS, as noted above. Certain aspects of prioritizing code locations based on changes performed in the code are addressed in a U.S. patent application entitled "Evaluation of Software Based on Change History," which is filed on even date with the present patent application.

In alternative embodiments, processor 44 may classify code locations into any suitable kinds and any suitable number of classes, and may assign intra-class and inter-class priorities to the different code locations in accordance with any suitable logic or criteria. Further alternatively, processor 44 may assign priorities to individual code locations without classifying them, using any suitable logic or criteria that is based on the review information of the locations.

The list of code locations produced by processor 44 is prioritized in accordance with the level of additional resources that should be allocated for locating faults in these locations, based on the coverage information and the review information. In some embodiments, the list is presented in descending order of priority, i.e., presents the locations that deserve attention but currently lack coverage first. Other locations (i.e., locations that are already well-covered and locations that are less important) are assigned lower priorities and appear further down the list. In alternative embodiments, the prioritized list is presented in an ascending order of priority. In other words, processor 44 may present a list of code locations that may be skipped or overlooked with little risk. Further alternatively, the list can be presented to highlight both highest-priority and lowest-priority locations. In other words, processor 44 may present a first list of code locations that deserve special attention, and a second list of locations that may be skipped.

In some embodiments, coverage measurement unit 36 calculates coverage metrics for different code locations. The metric value assigned to a certain code location is indicative of the level of coverage of this location by test cases 28. In these embodiments, processor 44 may produce the prioritized list of code locations by adjusting the coverage metrics based on the review information. For example, processor 44 may apply review-related weights to the coverage metrics. The weight applied to the coverage metric of a certain code location depends on the level of attention that should be given to the code location, as indicated by the review information.

User 50 may perform various actions with respect to the software code based on the prioritized list of code locations. For example, the user may modify test cases 28 (e.g., add, delete or modify test cases) in order to focus on locations that are likely to contain bugs, to focus on critical sections of the code and/or to improve coverage. When testing time or testing resources are limited, the user may modify the order in which test cases are applied, so as to cover fault-prone or critical locations first.

In the embodiment shown in FIG. 1, processor 44 prioritizes the list of code locations based on both coverage information and review information. In alternative embodiments, however, processor 44 may prioritize the list irrespective of coverage, i.e., based only on review information. Thus, in a simpler configuration, unit 36 may be omitted.

Although the configuration of FIG. 1 refers to a system for software testing, the principles of the present invention can also be used in other types of operations and actions performed on software. For example, when reviewing software, reviewing resources (e.g., time and/or availability of human reviewers) are often limited. In many cases, only a small part of the code can be reviewed within the available resources. In such situations, system 20 may present a prioritized list of code locations to be reviewed, so that critical and/or fault-prone locations are reviewed first.

As another example, the prioritized list of code locations can be used for defining formal models for parts of the code. In some embodiments, a user produces one or more formal models of one or more of the high-priority locations indicated by the list. The models can then be verified in order to validate the code at the locations in question. Thus, when using the prioritization methods described herein, modeling and verification resources are allocated to high-priority code locations and away from lower-priority locations.

In some embodiments, the prioritization methods described herein can be embodied in an automated review tool. In these embodiments, the methods described herein can be used to direct the reviewer(s) to code locations that deserve attention and/or to locations that may be skipped. Such prioritization and direction may be carried out either before the review session (e.g., when planning the session) or during the session.

Prioritization Method Description

Figure 2:
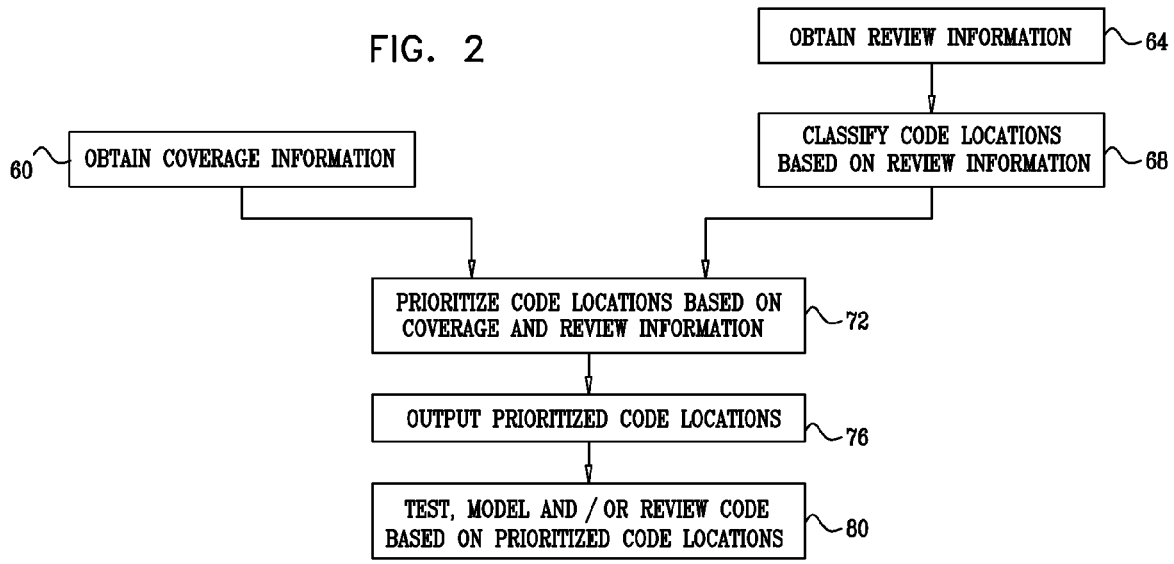
FIG. 2 is a flow chart that schematically illustrates a method for operating on software code, in accordance with an embodiment of the present invention.

FIG. 2 is a flow chart that schematically illustrates a method for operating on software code, in accordance with an embodiment of the present invention. The method begins with prioritization processor 44 of system 20 obtaining coverage information from coverage measurement unit 36, at a coverage information input step 60. Processor 44 also obtains review information from database 40, at a review information input step 64. The prioritization processor classifies the code locations into two or more predefined classes based on the review information that is relevant to each respective location, at a classification step 68. Steps 60 and 64-68 may be carried out in any order, in order to provide processor 44 with both coverage information and review history information.

Prioritization processor 44 prioritizes the code locations based on the obtained coverage information and review information, at a prioritization step 72. Processor 44 may apply any suitable criteria for assigning priorities to code locations, such as any of the criteria and heuristics described above. In some embodiments, processor 44 assigns each location a review-related priority in accordance with the class with which it is associated, as described above. The processor then adjusts the coverage metric assigned to each location by the respective review-related priority.

Processor 44 outputs the prioritized list of code locations, at an output step 76. For example, the prioritization processor may present the list to user 50 using display 52. User 50 then performs a certain action with respect to the software code based on the prioritized list of code locations, at an operation step 80. As explained above, the user may test, review or model and verify the software, or modify the testing, reviewing and/or modeling and verification process, based on the prioritized list. Generally, the priorities assigned to the different code locations are indicative of the future fault-locating resources that are to be allocated to the different locations. The user may allocate the resources as recommended by the list, and locate the faults using the allocated resources.

Although the embodiments described above mainly address assigning priorities to locations of software code that subsequently executes on a suitable processor, the methods and systems described herein can also be used for prioritizing code locations in firmware code. The firmware code may be written in any suitable language, such as in C. In the context of the present patent application and in the claims, such code is also regarded as a sort of software code.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for software processing, comprising:

obtaining, for a software code, review information pertaining to code reviews, in which human reviewers examine lines of software code, that have been conducted on respective locations in software code;

partitioning the obtained software code into a plurality of individual code locations, each including a plurality of code lines;

processing the review information, by a processor, so as to assign to at least some of the individual locations respective priorities, which are indicative of respective likelihoods that the locations contain program faults, wherein processing the review information comprises predefining a set of classes and respective class priorities, classifying each of the at least some of the locations to one of the classes based on the review information, and assigning the priorities responsively to the class priorities of the respective classes to which the at least some of the locations were classified; and presenting the at least some of the locations via an output device to a user in accordance with the assigned priorities.

2. The computer-implemented method according to claim 1, and comprising allocating a resource for finding the program faults in the respective locations responsively to the assigned priorities, and locating the program faults at the locations using the allocated resource.

3. The computer-implemented method according to claim 2, wherein locating the program faults comprises testing the software code by subjecting the code to a set of test cases, and wherein allocating the resource comprises modifying the set of test cases responsively to the priorities.

4. The computer-implemented method according to claim 3, wherein testing the software comprises obtaining coverage information, which assesses a coverage level of one or more of the locations by the set of test cases, and wherein processing the review information comprises assigning the priorities responsively to both the review information and the coverage information.

5. The computer-implemented method according to claim 2, wherein locating the program faults comprises reviewing the code in at least some of the locations responsively to the priorities.

6. The computer-implemented method according to claim 2, wherein locating the program faults comprises defining one or more formal models of the code in at least some of the locations responsively to the priorities, and verifying the code using the formal models.

7. The computer-implemented method according to claim 1, wherein processing the review information comprises assigning the priorities in accordance with a number of the reviews that have been conducted on the respective locations.

8. The computer-implemented method according to claim 1, wherein obtaining the review information comprises obtaining comments made by human reviewers with respect to reviewed code locations.

9. The computer-implemented method according to claim 1, wherein obtaining the review information comprises obtaining information on code locations pointed at by a human performing a review.

10. The computer-implemented method according to claim 1, wherein processing the review information so as to assign to at least some of the locations respective priorities comprises assigning priorities responsive to a number of reviews of each location.

11. The computer-implemented method according to claim 1, wherein obtaining the review information comprises presenting to a human user, by an automated review tool, lines of code and receiving through the tool user input regarding presented code lines.

12. The computer-implemented method according to claim 1, wherein obtaining the review information comprises obtaining review information from a version control system.

13. The computer-implemented method according to claim 1, wherein processing the review information so as to assign to at least some of the individual locations respective priorities comprises assigning the priorities by the processor responsive to both information on changes performed to the individual locations and the review information.

14. The computer-implemented method according to claim 13, wherein processing the review information so as to assign to at least some of the individual locations respective priorities comprises assigning the priorities by the processor responsive to the occurrence times of the changes of the individual locations relative to times of reviews of the individual locations.

15. The computer-implemented method according to claim 1, wherein processing the review information so as to assign to at least some of the individual locations respective priorities comprises assigning the priorities by the processor responsive to both test coverage information and review information.

16. The computer-implemented method according to claim 1, wherein the individual locations comprise files, functions or objects of an object oriented software code.

17. Apparatus for software processing, comprising:

a processor, which is coupled to obtain review information pertaining to code reviews of a software code, in which human reviewers examine lines of the software code;

to partition the obtained software code into a plurality of individual code locations, each including a plurality of code lines;

to process the review information so as to assign to at least some of the individual locations respective priorities, which are indicative of respective likelihoods that the locations contain program faults, wherein processing the review information comprises predefining a set of classes and respective class priorities, classifying each of the at least some of the locations to one of the classes based on the review information, and assigning the priorities responsively to the class priorities of the respective classes to which the at least some of the locations were classified; and an output device, which is operative to present the at least some of the locations to a user in accordance with the assigned priorities.

18. The apparatus for software processing according to claim 17, and comprising a test system, which is configured to test the software code by subjecting the code to a set of test cases and to modify the set of test cases responsively to the priorities.

19. The apparatus for software processing according to claim 18, wherein the test system is configured to obtain coverage information, which assesses a coverage level of one or more of the locations by the set of test cases, and wherein the processor is coupled to assign the priorities responsively to both the review information and the coverage information.

20. The apparatus for software processing according to claim 17, wherein the processor is coupled to assign the priorities in accordance with
a number of the reviews that have been conducted on the respective locations.

\* \* \* \* \*